United States Patent
Schmeink et al.

(10) Patent No.: US 8,639,712 B2
(45) Date of Patent: Jan. 28, 2014

(54) METHOD AND MODULE FOR CREATING A RELATIONAL DATABASE SCHEMA FROM AN ONTOLOGY

(75) Inventors: Anke Schmeink, Herzogenrath (DE); Sandra Geisler, Aachen (DE); Andreas Brauers, Aachen (DE); Christoph Josef Quix, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 167 days.

(21) Appl. No.: 13/132,948

(22) PCT Filed: Dec. 7, 2009

(86) PCT No.: PCT/IB2009/055548
§ 371 (c)(1),
(2), (4) Date: Jun. 6, 2011

(87) PCT Pub. No.: WO2010/067301
PCT Pub. Date: Jun. 17, 2010

(65) Prior Publication Data
US 2011/0238711 A1    Sep. 29, 2011

(30) Foreign Application Priority Data
Dec. 12, 2008 (EP) .................................. 08171420

(51) Int. Cl.
*G06F 17/00* (2006.01)
*G06F 17/30* (2006.01)

(52) U.S. Cl.
USPC ........... 707/761; 707/802; 707/822; 707/828; 707/755; 707/756; 707/791; 707/708; 705/7.11; 706/45; 715/763; 709/203

(58) Field of Classification Search
USPC ......... 707/761, 802, 822, 828, 755, 756, 791, 707/708; 705/7.11; 706/45; 715/763
See application file for complete search history.

(56) References Cited

U.S. PATENT DOCUMENTS

| | | | |
|---|---|---|---|
| 7,099,885 B2 * | 8/2006 | Hellman et al. | 1/1 |
| 7,146,399 B2 * | 12/2006 | Fox et al. | 709/203 |
| 7,293,010 B2 * | 11/2007 | Angele et al. | 1/1 |
| 7,472,137 B2 * | 12/2008 | Edelstein et al. | 1/1 |
| 7,558,791 B2 * | 7/2009 | Wahl | 1/1 |
| 7,962,503 B2 * | 6/2011 | Edelstein et al. | 707/761 |

FOREIGN PATENT DOCUMENTS

WO    2006011102 A1    2/2006

OTHER PUBLICATIONS

Geisler et al: "Ontology-Based System for Clinical Trial Data Management"; IEEE Benelux EMBS Symposium, Dec. 6-7, 2007, 4 Page Document.

(Continued)

Primary Examiner — Yicun Wu

(57) ABSTRACT

A method for creating a relational database schema is provided. The method comprises accessing (110, 210) a reference ontology (101) comprising a first number of concepts and a second number of properties, selecting (120, 220) a first set of concepts from the reference ontology, determining (130, 230) a first set of properties from said second number of properties, associated with the selected first set of concepts, determining (140, 240) a second set of concepts associated with the determined first set of properties, and generating (150, 250) a relational database schema comprising a number of tables, of which at least one table pertains to a concept of said second set of concepts. Further, a module (300) for creating a relational database schema is provided.

20 Claims, 3 Drawing Sheets

(56) References Cited

OTHER PUBLICATIONS

Athanasiadis et al: "Ontologies, Java Beans and Relational Databases for Enabling Semantic Programming"; 31st Annual International Computer Software and Applications Conference (COMPSAC 2007), 2007 IEEE, pp. 341-346.

Kim et al: "Pruning Bio-Ontologies"; Proceedings of the 40th Hawaii International Conference on System Sciences (HICSS'07); 2007 IEEE, 10 Page Document.

Merzweiler et al: "TERMTrial-Terminology-Based Documentation Systems for Cooperative Clinical Trials"; Computer Methods and Programs in Biomedicine (2005), vol. 78, No. 1, pp. 11-24.

Gruber, T.: "A Translation Approach to Portable Ontology Specification,"; Knowledge Acquisition, 1993, vol. 5, 24 Page Document.

"Ontology Matching"; Power Point Presentation From http://www.icsd.aegean.gr/kotis/., Copyright Ai-LAB, ICS Eng. Department, University of the Aegean-2007, 54 Page Document.

Noy et al: "The Prompt Suite; Interactive Tools for Ontology Merging and Mapping"; Technical Report, SMI, Stanford University, Aug. 2005, 69 Page Article.

Chong et al: "Ontology Based Metadata Management in Medical Domains"; Journal of Research and Practice in Information Technology, vol. 35, No. 2, May 2003, pp. 139-154.

Gottgtroy et al: "An Ontology Engineering Approach for Knowledge Discovery From Data in Evolving Domains"; Knowledge Engineering and Discovery Institute, Auckaland University of Technology, New Zealand, Downloaded From www.aut.ac.nz/resources/research/research_institutes/kedri/downloads/pdf/datamining200.3.pdf, 10 Page Document.

\* cited by examiner

METHOD AND MODULE FOR CREATING A RELATIONAL DATABASE SCHEMA FROM AN ONTOLOGY

FIELD OF THE INVENTION

This invention relates to a method and module for creating a relational database. More particularly, the invention relates to a method for creating a relational schema based on a selection of ontology concepts.

BACKGROUND OF THE INVENTION

Clinical trials are a common mean in medical research to investigate new medications, medical devices and other medical products. Frequently, new studies are issued and the number of conducted clinical trials increases. The study register of the U.S. National Institutes of Health for example, which is one of the most frequently used public databases for clinical studies, contained approximately 23,500 clinical studies in 2006. In January 2008, the registered trials more than doubled to almost 50,000 studies from over 153 countries. Especially, the pharmaceutical industry and manufacturers of medical devices push the conduct of more and more studies. Therefore, the need for rapid and efficient but also accurate study planning, conducting and analysis of results is indispensable. Particularly the data collected during clinical trials is very valuable to the organizations controlling and executing the trials. Hence, the careful collection, handling and storage of the data while obeying national and international regulations are a major task in clinical study management.

Companies in the field of medical technology are concerned with the development of novel medical devices, which contribute to the development and improvement of diagnostics, therapy, prevention and monitoring of diverse diseases. For this purpose clinical trials and preliminary pilot trials are conducted. During the trials, data of interest is acquired in various formats by means of the developed devices, by questionnaires, case report forms and more. Afterwards the gathered data is processed and statistically analyzed to evaluate the quality and applicability of the novel devices. Furthermore, the coherence between acquired data and the disease progression as well as the health status of the patient is targeted. The results may be compared with data of devices, which are used in current medical practice or analyzed to gain new insights into certain disease progressions.

One way to manage clinical trials is to use ontologies. According to A Translation Approach to Portable Ontology Specification, Knowledge Acquisition 5:199-220, 1993, by Thomas Gruber, an ontology is a formal, explicit specification of a shared conceptualization. It describes a domain of interest in a machine readable and semantic way such that the concepts of the domain, relationships among them and constraints can be expressed such that a majority of a larger community agrees upon it.

Ontologies are used in the fields of artificial intelligence, knowledge engineering and the Semantic Web and are developed for variety of domains, including biomedicine or physics.

The modeling and use of ontologies in the field of database creation and data integration offers several benefits. Ontologies describe domains on a high abstraction level. The strengths of ontologies lie especially in the possibility to build a consistent and formal vocabulary, which cannot only be used for the definition of the structure and meaning of data stored in a database, but also be reused, to interoperate with and build applications based on this vocabulary.

Most of the existing systems are based on Entity-Attribute-Value (EAV) database design. This prohibits efficient database management through, e.g., indexing, partitioning, query optimization and thus hampers data analysis and ad-hoc querying.

Clinical trials are often conducted by multidisciplinary teams. An ontology based approach for creating trial databases provides a common basis on a high abstraction level, which allows users to design the databases conceptually independent of physical design issues such as indexes and keys.

Ontology-based system for clinical trial data management, IEEE Benelux EMBS Symposium, Dec. 6-7, 2007 of Geisler, S. et al describes an ontology based system for the design of clinical trial data management. A reference ontology serves as basis for the generation of clinical trial databases.

However, a drawback of the above mentioned system is that it cannot guarantee referential integrity, since some relational dependencies may be lost during the generation of the relational database. Furthermore, such a system is inefficient and lacks flexibility.

Hence, an improved method for creating a relational database schema from an ontology would be advantageous.

SUMMARY OF THE INVENTION

Accordingly, the present invention preferably seeks to mitigate, alleviate or eliminate one or more of the above-identified deficiencies in the art and disadvantages singly or in any combination and solves at least the above-mentioned problems by providing a method, module, and computer program product according to the appended patent claims.

An object according to some embodiments is to provide a method supporting a rapid and accurate setup of relational databases.

Another object according to some embodiments is to provide a method for efficient, flexible and user-friendly design of relational databases.

An idea according to some embodiments is to provide automatic supplementation of concept selection with referenced concepts in order to guarantee relational integrity of the generated relational database.

According to an aspect, a method for creating a relational database schema is provided. The method comprises accessing a reference ontology comprising a first number of concepts and a second number of properties, selecting a first set of concepts from the reference ontology, determining a first set of properties from said second number of properties, associated with the selected first set of concepts, determining a second set of concepts associated with the determined first set of properties, and generating a relational database schema comprising a number of tables, of which at least one table pertains to a concept of said first second set of concepts.

Herein, the term "table" should be interpreted broadly to cover all equivalents for representing relations in the field of information technology and database modeling.

The method could be implemented for several different applications, such as for creating a relational database schema for clinical trial data management, or for research tasks using different experimental setups.

According to an aspect, a module for creating a relational database schema is provided. The module comprises a unit for accessing a reference ontology comprising a first number of concepts and a second number of properties, a user interface for enabling a user to select a first set of concepts from the reference ontology and adapt the relational database schema, a unit for determining a first set of properties from said second number of properties, associated with the selected first set of concepts, a unit for determining a second set of concepts associated with the determined first set of properties, and a unit for generating a relational database schema comprising a number of tables, of which at least one table pertains to a concept of said second set of concepts.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

Several embodiments will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended patent claims. Furthermore, the terminology used in the detailed description of the particular embodiments illustrated in the accompanying drawings is not intended to be limiting of the invention.

The following description focuses on embodiments applicable to a method of creating a relational database.

Figure 1:
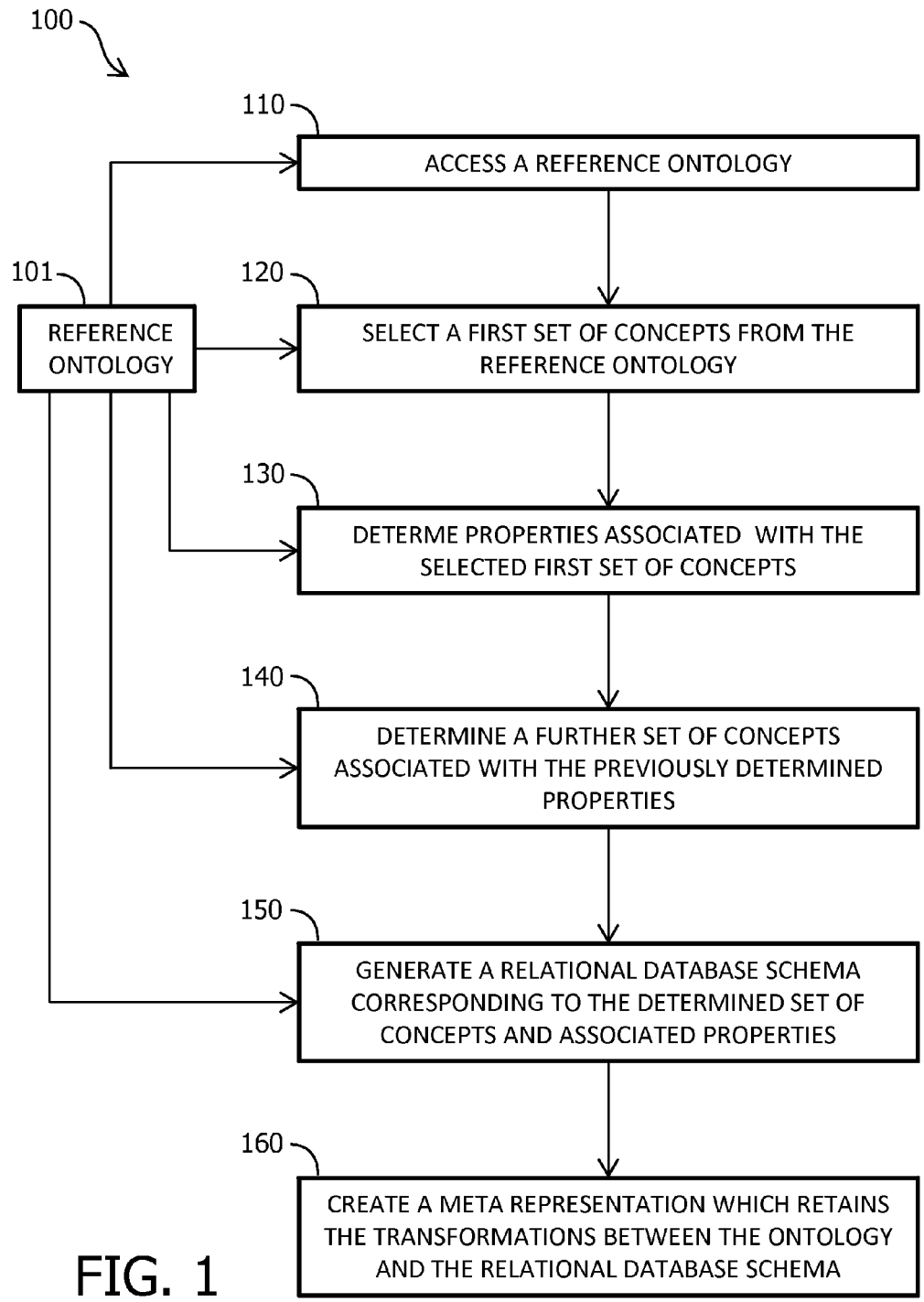
FIG. 1 is a flow chart schematically showing a method according to an embodiment.

In an embodiment, according to FIG. 1, a method 100 for creating a relational database schema begins with accessing 110 a reference ontology 101. The reference ontology 101 comprises a plurality of concepts and properties, each property being associated with at least one concept. The method 100 further comprises selecting 120 a first set of concepts from the reference ontology, and thereafter determining 130 properties associated with the selected first set of concepts. Subsequently, the method 100 comprises determining 140 a further set of concepts associated with the previously determined properties. A subsequent step of generating 150 a relational database schema corresponding to the determined set of concepts and associated properties is thereafter performed. The method 100 is advantageous in the distinct selection of parts of the reference ontology without changing the ontology or using external ontology editors. Thereby, the reference ontology is left intact while reducing the complexity for the prospective relational database schema.

In an embodiment, determining 140 a further set of concepts associated with the determined properties is repeated until all concepts associated with the determined properties are determined. Hence, the relational integrity of the relational database schema is automatically guaranteed, thus further facilitating the method 100.

In an embodiment, the method 100 further comprises creating 160 a meta representation which retains the transformations between the ontology and the relational schema, such as which concept has been converted to which table and so forth.

In an embodiment, the method 100 comprises converting the determined set of concepts and associated properties to at least one Data Definition Language (DDL) script file. This is advantageous in that the DDL files, e.g. SQL scripts, can be stored for later access.

In an embodiment, the method 100 also comprises creating a relational database by means of the relational database schema. The relational database may be created on a local or remote database server. Hence, improved flexibility is provided since the database can be created either directly, or later by executing the DDL script files.

In an embodiment, the method 100 comprises displaying the relational database schema by means of a user interface. This further increases the flexibility of the method, allowing the user to modify the selection of concepts before the actual database is created.

In an embodiment, the method 100 comprises adapting the preview of the relational schema by means of the above user interface. For example, the user may rename, add or delete tables and attributes in the relational schema. Such adaptation may be reflected by changing the set of selected concepts, and by labeling the meta representation. Hence, flexibility in the creation of the relational schema is provided.

In a further embodiment, the method comprises converting the ontology hierarchy. If a selected concept has a superconcept that is also included in the selected set of concepts, two tables are created and a 1:1 relationship is established between the tables. If a selected concept has a superconcept that is not included in the selected set of concepts, only one concept for the selected concept is created and the properties of the superconcept are added as attributes to the created table.

In an embodiment, the step of converting the ontology hierarchy is done recursively.

Figure 2:
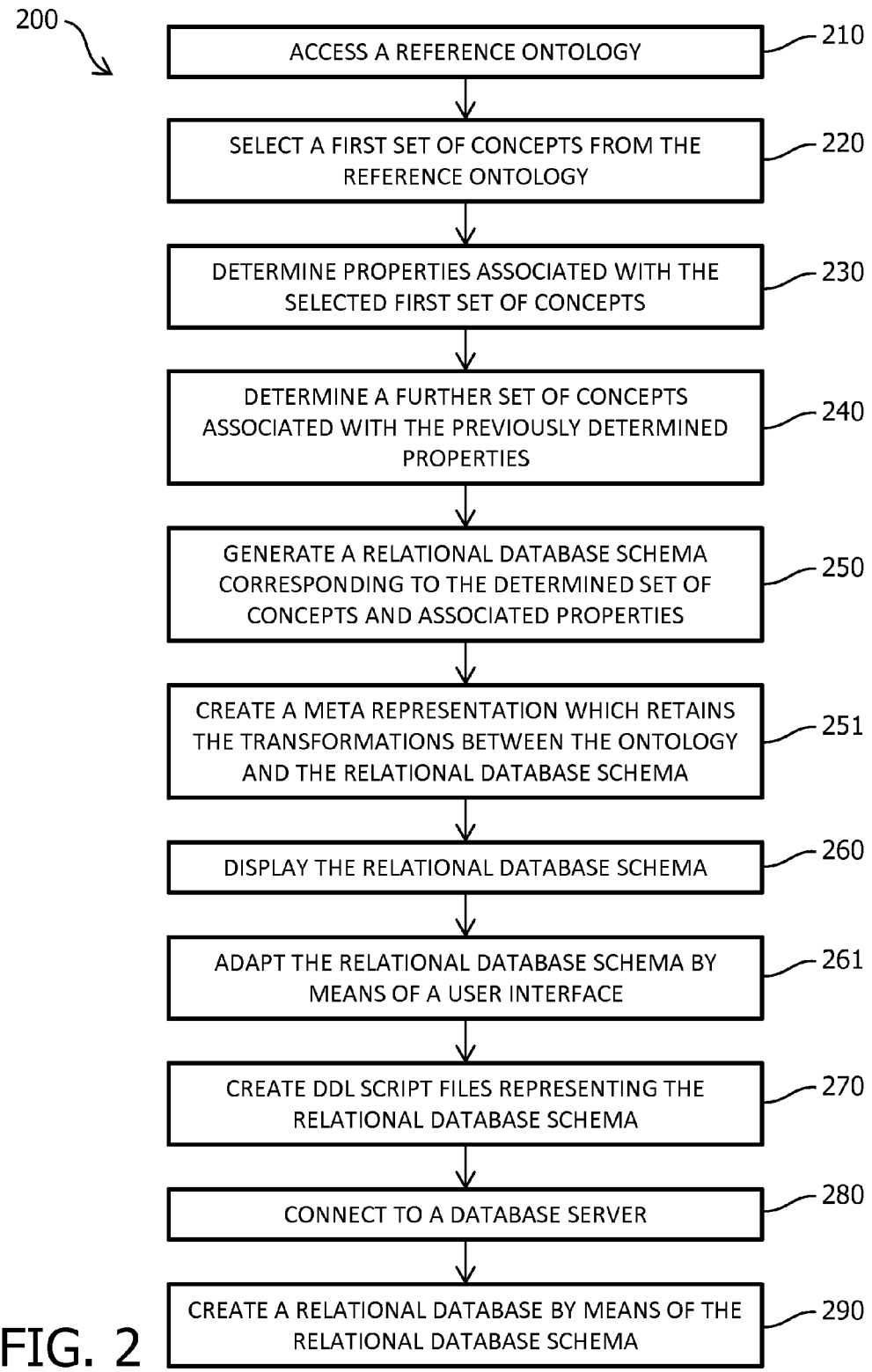
FIG. 2 is a flow chart schematically showing a method according to an embodiment.

In FIG. 2, a method 200 according to some embodiments is provided. Here, accessing 210 a reference ontology, selecting 220 a first set of concepts from the reference ontology, determining 230 properties associated with the selected first set of concepts, determining 240 a further set of concepts associated with the previously determined properties, and generating 250 a relational database schema corresponding to the determined set of concepts and associated properties is performed in the same manner as in the method previously described with reference to FIG. 1. The steps of determining 240 a further set of concepts associated with the previously determined properties, and determining 230 properties associated with the concepts may be repeated and done recursively, in order to find all related concepts in a chain.

Accordingly, in an embodiment the method further comprises determining (130, 230) a second set of properties from said second number of properties, associated with the determined second set of concepts. The method may also comprise determining (140, 240) a third set of concepts associated with the determined second set of properties. Moreover, the relational database schema comprises at least one table pertaining to a concept of the third set of concepts.

The method 200 further includes creating a meta representation 251 which retains the transformations between the ontology and the relational schema.

The method 200 further comprises displaying 260 the relational database schema and adapting 261 the relational database schema by means of a user interface, and creating 270 DDL script files representing the relational schema generated in 250. Subsequently, the method 200 comprises connecting 280 to a database server, for creating 290 a relational database by means of the relational database schema.

The Clinical Trial Data Management Ontology (CTDMO) may serve as the reference ontology 101, for creating databases for clinical trials in a convenient and flexible way.

In an embodiment, the CTDMO is configured to be extended with further concepts and properties.

In an alternative embodiment, the CTDMO comprises all required information for standard clinical trials.

In some embodiments, the method 200 may be executed according to the following. A user is enabled, by means of a user interface, to load and view the structure of the reference ontology 101. By means of the user interface, the user is enabled to select concepts from the reference ontology 101, which concepts will be used to create the relational database. The concepts are automatically supplemented by additional concepts from the ontology, which are related to the selected concepts by a recursive process. In an embodiment, an algorithm loops through the properties associated with the selected concepts, and checks whether the current property is an object property. If so, the algorithm further checks to which further concepts the current object property relates to. A recursive call then repeats the same procedure for all related concepts. Each related concept is added to a list of concepts already comprising the concepts selected by the user. The list of selected and related concepts, i.e. a subset of the reference ontology 101, is used to generate the relational database.

The user interface may present a preview of the created database schema to the user. In case of well experienced users, such may be allowed to define customized views of the database preview. Furthermore, the users may adapt the created relational database schema in the preview. For example, the user may rename, add or delete tables and attributes in the relational schema. The creation of the relational database may either be executed directly by connecting to a database server, or the user can save DDL script files, such as SQL scripts, which include the code to create a database by executing the scripts.

Figure 3:
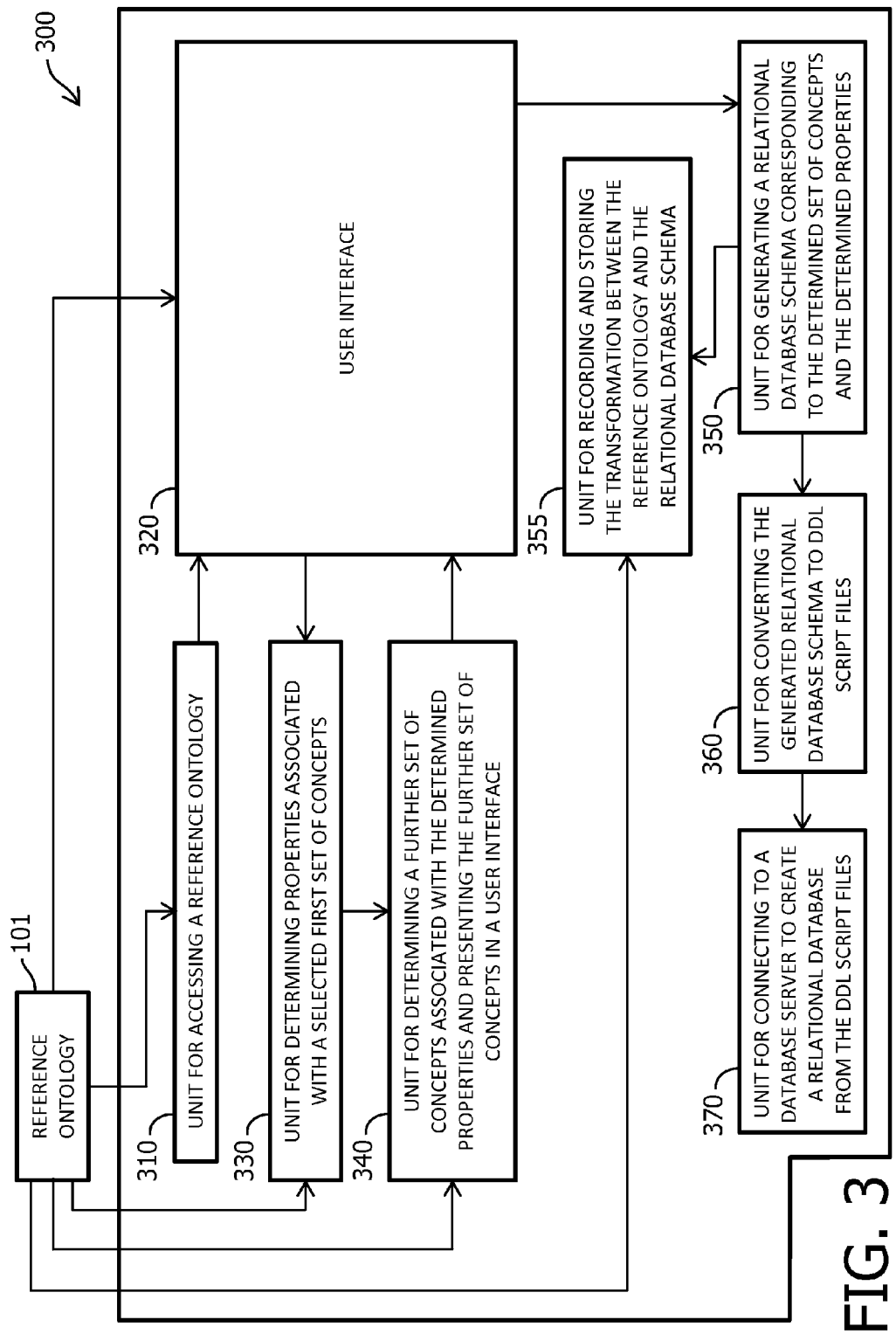
FIG. 3 is a block scheme of a module according to an embodiment.

In FIG. 3, a module 300 according to an embodiment is provided. The module 300 comprises a unit 310 for accessing a reference ontology 101 of a plurality of concepts and properties. A user interface 320 is provided to display a graphical representation of the reference ontology 101 to a user. By means of the user interface 320, the user is enabled to select a first set of concepts from the reference ontology 101. Further, a unit 330 for determining those properties being associated with selected first set of concepts is provided. A unit 340 is configured to determine a further set of concepts being associated with the determined properties, and to present the further set of concepts in the user interface 320. A unit 350 is provided to generate a relational database schema corresponding to the determined set of concepts, i.e. the first set of concepts and the further set of concepts, and the determined properties. By means of a unit 360, the generated relational database schema is converted to DDL script files. Further, the module 300 comprises a unit 370 for connecting said module to a database server (not shown) configured to create a relational database from the DDL script files.

In an embodiment, the module is configured to provide authentication information to the database server for executing the DDL script files against the database server.

In another embodiment, a user is enabled to store the DDL script files either locally on a computer or remotely on a server, for later execution on a database server.

Furthermore, a unit 355 for recording and storing the transformations between the reference ontology 101 and the created relational schema is included in the module.

In an embodiment, a computer program product is provided. The computer program is stored on a computer-readable medium comprising software code adapted to perform the steps of the method 100 according to some embodiments when executed on a data-processing apparatus.

The invention may be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

It will be appreciated that the embodiments described in the foregoing may be combined without departing from the scope as defined by the appended patent claims.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method for creating a relational database schema, comprising:
   accessing a reference ontology comprising a first number of concepts and a second number of properties;
   selecting a first set of concepts from the reference ontology;
   determining a first set of properties from said second number of properties, associated with the selected first set of concepts;
   determining a second set of concepts associated with the determined first set of properties; and
   generating a relational database schema comprising a number of tables, of which at least one table pertains to a concept of said second set of concepts;
   wherein the method is performed by at least one processor.

2. The method according to claim 1, wherein at least one table of said number of tables of said relational database schema pertains to a concept of said first set of concepts.

3. The method according to claim 1, wherein at least one table of said number of tables of said relational database schema pertains to a property of the determined first set of properties.

4. The method according to claim 1, further comprising:
   creating a meta representation comprising transformations between the reference ontology and the generated relational database schema.

5. The method according to claim 1, further comprising:
determining a second set of properties from said second number of properties, associated with the determined second set of concepts; and
determining a third set of concepts associated with the determined second set of properties, wherein the relational database schema comprises at least one table pertaining to a concept of the third set of concepts.

6. The method according to claim 1, further comprising:
creating a relational database by means of the created relational database schema.

7. The method according to claim 1, further comprising:
automatically determining the second set of concepts from the first number of concepts, associated with the determined first set of properties.

8. The method according to claim 1, wherein the first number of concepts are arranged in a hierarchy with each of the second number of properties being associated with at least one of the first number of concepts.

9. The method according to claim 1, further comprising:
in response to a concept of the selected first set of concepts including a superconcept in the selected first set of concepts, create two tables with a 1:1 relationship therebetween, the two tables corresponding to the concept and the superconcept; and
in response to a concept of the selected first set of concepts including a superconcept that is not in the selected first set of concepts, create a table corresponding to the concept and including attributes corresponding to properties of the superconcept.

10. The method according to claim 1, further including:
receiving the selection of the first set of concepts from a user input device; and
displaying a preview of the relational database schema.

11. The method according to claim 1, further comprising:
until all concepts associated with the determined first set of properties are determined, repeatedly and automatically:
determining a further set of properties from said second number of properties, and associated with a further set of concepts, wherein the further set of concepts is initially the second set of concepts; and
determining the further set of concepts associated with the determined further set of properties.

12. A non-transitory computer readable medium carrying software code which controls at least one processor to:
access a reference ontology comprising a first number of concepts and a second number of properties, the first number of concepts arranged in a hierarchy with each of the second number of properties being associated with at least one of the first number of concepts;
select a first set of concepts from the reference ontology;
determine a first set of properties from said second number of properties, associated with the selected first set of concepts;
automatically determine a second set of concepts from the first number of concepts, and associated with the determined first set of properties, without changing the reference ontology or using an ontology editor; and
generate a relational database schema comprising a number of tables, of which at least one table pertains to a concept of said second set of concepts.

13. The non-transitory computer readable medium according to claim 12, wherein the software code further controls the at least one processor to:
automatically and repeatedly determine a further set of concepts from the first number of concepts, and associated with the determined first set of properties, until all concepts associated with the determined first set of properties are determined.

14. A system for creating a relational database schema, comprising:
at least one processor programmed to:
access a reference ontology comprising a first number of concepts and a second number of properties, the first number of concepts arranged in a hierarchy with each of the second number of properties being associated with at least one of the first number of concepts;
enable a user to select a first set of concepts from the reference ontology, and adapt the relational database schema, by a user interface;
automatically determine a first set of properties from said second number of properties, associated with the selected first set of concepts;
automatically and repeatedly determine a further set of concepts from the first number of concepts, and associated with the determined first set of properties, until all concepts associated with the determined first set of properties are determined; and
generate a relational database schema comprising a number of tables, of which at least one table pertains to a concept of said further set of concepts.

15. The system according to claim 14, wherein the at least one processor is further programmed to:
create a meta representation comprising transformations between the reference ontology and the generated relational schema.

16. The system according to claim 14, wherein the at least one processor is further programmed to:
convert the selected first set of concepts, the determined further set of concepts, and the determined first set of properties in to at least one Data Definition Language (DDL) script file.

17. The system according to claim 14, wherein the at least one processor is programmed to:
generate a relational database from the created relational database schema.

18. The system according to claim 17, wherein the at least one processor is further programmed to:
connect with a remote database server, wherein said relational database is generated on said remote database server.

19. The system according to claim 14, wherein said user interface to includes a user input device and a display which displays a preview of the relational database schema.

20. The system according to claim 19, wherein said user interface is configured to adapt the relational database schema.

* * * * *